United States Patent [19]

Tsuda et al.

[11] Patent Number: 5,170,237
[45] Date of Patent: Dec. 8, 1992

[54] SEMICONDUCTOR PRESSURE SENSOR

[75] Inventors: Naoyuki Tsuda, Ohtsu; Tsuneo Yamaguchi, Moriyama; Tadataka Kaneko, Minoo, all of Japan

[73] Assignee: Matsushita Electronics Corporation, Osaka, Japan

[21] Appl. No.: 608,557

[22] Filed: Nov. 2, 1990

[30] Foreign Application Priority Data

Nov. 6, 1989 [JP] Japan ................. 1-287424

[51] Int. Cl.⁵ ................. H01L 29/84; H01L 29/96
[52] U.S. Cl. ................. 257/419; 73/721; 257/536; 257/629
[58] Field of Search ............. 357/26, 51, 52; 73/719, 73/720, 721

[56] References Cited

U.S. PATENT DOCUMENTS 4,672,411 6/1987 Shimizu et al. ................. 357/26

FOREIGN PATENT DOCUMENTS 8606548 11/1986 European Pat. Off. .
89/03592 4/1989 World Int. Prop. O. ........... 357/26

OTHER PUBLICATIONS

Kanda, Y. et al "Improved Si Piezo-Transistors . . . " IEEE Trans. Elec. Devices Jul. 1978, 813-818.

Primary Examiner—Andrew J. James
Assistant Examiner—Sara W. Crane
Attorney, Agent, or Firm—Ratner & Prestia

[57] ABSTRACT

A semiconductor pressure sensor comprising a diaphragm area formed on a semiconductor chip, a plurality of gauge resistances arranged on one face of the diaphragm area to form a bridge circuit, and an oxide film formed on the top of the diaphragm area, wherein at least one additional pattern is formed in a portion of said diaphragm area other than said gauge resistances. The thickness of the oxide film on said additional pattern is smaller than the thickness of the oxide film on portions other than said gauge resistances and said additional pattern.

3 Claims, 4 Drawing Sheets 5,170,237

SEMICONDUCTOR PRESSURE SENSOR

BACKGROUND OF THE INVENTION

1. Field of the Invention

This invention relates to a semiconductor pressure sensor for use in various control units.

2. Description of the Prior Art

A conventional semiconductor pressure sensor is shown in plan view in FIG. 3. The semiconductor pressure sensor comprises a rectangular diaphragm area 14 formed centrally on the (100) face of an n-type silicon semiconductor chip, four gauge resistances 5, 6, 7 and 8 arranged on one surface within the diaphragm area 14 which are formed at respective median portions of individual sides of the diaphragm area 14, and low resistance link resistances 9, 10, 11, 12, and 13 which electrically interconnect the gauge resistances 5, 6, 7 and 8, the link resistances 9, 10, 11, 12 and 13 forming a bridge circuit in conjunction with the gauge resistances 5, 6, 7 and 8.

The link resistance 9 is electrically connected to the gauge resistances 5 and 6, and is partially formed with a bonding pad 1 for external biasing. A bonding pad 2 is connected to the link resistances 11 and 12 which are connected respectively to the gauge resistances 7 and 8. A lead-out resistance 10a is connected to the link resistance 10 which is electrically connected to the gauge resistances 6 and 7, and an output bonding pad 3 is connected to the lead-out resistance 10a. Similarly, a lead-out resistance 13a is connected to the link resistance 13 which is electrically connected to the gauge resistances 5 and 8, and an output bonding pad 4 is connected to the lead-out resistance 13a.

FIGS. 4(a) to 4(d) are sections taken along the line A—A in FIG. 3, which illustrate the process for producing a semiconductor pressure sensor of the above mentioned type. Such semiconductor pressure sensors are produced according to the following procedure. A silicon oxide film 21 is first formed on an n-type silicon semiconductor base 20 by thermal oxidation (FIG. 4(a)), and a resist (not shown) is placed over the silicon oxide film 21. Then, portions of the oxide film 21 and of the resist in which link resistances 9 to 13 are to be formed are removed by photolithoghography and etching. Next, boron ions of high concentration are implanted using the resist as a mask and then the resist is removed (FIG. 4(a)).

Again, a resist 22 (FIG. 4(b)) is formed all over the semiconductor base 20, and portions of the resist 22 and of the oxide film 21 in which gauge resistances 5 to 8 are to be formed are removed by photolithoghography and etching. Boron ions of low concentration are then implanted using the resist 22 as a mask (FIG. 4(b)). Subsequently, the semiconductor base is heated to thereby effect thermal diffusion of the boron ions in the link resistances 9 to 13 and gauge resistances 5 to 8.

Next, a silicon oxide film 23 (FIG. 4(c)) is deposited on the semiconductor base 20 all over using the CVD (chemical vapor deposition) technique. Again, portions of the oxide film 23 in which bonding pads 1 and 2 are to be formed are removed by photolithoghography and etching. Then, a film of aluminum metal is formed all over the semiconductor base 20, and bonding pads 1 and 2 are formed by photolithoghography and etching. The semiconductor base 20 is divided into chips, and a semiconductor pressure sensor as shown in FIG. 3 is thus obtained.

In the semiconductor pressure sensor of FIG. 3, when a certain external bias voltage is applied to the bonding pads 1, 2, current flows into the gauge resistances 5 to 8 and link resistances 9–13. In the case where no pressure is applied to the diaphragm area 14, the four gauge resistances 5 to 8 are of equal resistance value. When an external pressure is applied to the diaphragm area 14, some stress will develop in the diaphragm area 14. This stress has a piezoresistive effect such that the two pairs of gauge resistances 6, 8 and 5, 7 as components of a bridge circuit will have resistance values which are no longer equal, and as a result an output voltage corresponding to the pressure applied to the diaphragm area 14 develops across the bonding pads 3 and 4.

In such conventional semiconductor pressure sensors, as shown in FIG. 3, the diaphragm area 14 includes a residual area 15 in which none of the gauge resistances 5 to 8 or link resistances 9 to 13 are formed. The residual area 15 is centrally located in the diaphragm area 14 and covers a comparatively large area. As shown in FIG. 4(d), two silicon oxide film layers 21 and 23 are formed thicker in the residual area 15. The silicon and the silicon oxide film in the diaphragm area 14 have different coefficients of thermal expansion and, therefore, the presence of the residual area 15 having such spacious and thick silicon oxide film is a cause of internal stress (residual stress) development. This internal stress involves a problem such that when no external pressure to be measured is present, the voltage across the bonding pads 3 and 4, i.e., offset voltage, is not zero and is subject to large variation.

SUMMARY OF THE INVENTION

The semiconductor pressure sensor of this invention, which overcomes the above-discussed and numerous disadvantages and deficiencies of the prior art, comprises a diaphragm area formed on a semiconductor chip, a plurality of gauge resistances arranged on one face of the diaphragm area to form a bridge circuit, and an oxide film formed on the semiconductor surface of the diaphragm area, wherein at least one additional pattern is formed in a portion of said diaphragm area other than said gauge resistances, the thickness of the oxide film on said additional pattern being smaller than the thickness of the oxide film on portions other than said gauge resistances and said additional pattern.

The semiconductor pressure sensor of one embodiment of this invention comprises a diaphragm area formed on a semiconductor chip, a plurality of gauge resistances arranged on one face of the diaphragm area, low-resistance link resistances which electrically interconnect said gauge resistances to form a bridge circuit in conjunction with said gauge resistances, and an oxide film formed on the semiconductor surface of the diaphragm area, wherein at least one additional pattern is formed in a portion of said diaphragm area other than said gauge resistances and said link resistances, the thickness of the oxide film on said additional pattern being smaller than the thickness of the oxide film formed on portions other than said gauge resistances, said link resistances, and said additional pattern.

The semiconductor pressure sensor of another embodiment of this invention comprises a rectangular diaphragm area formed centrally on a semiconductor chip, four gauge resistances arranged on one face of the diaphragm area which are formed in respective median portions of individual sides of said diaphragm area, and low-resistance link resistances which electrically interconnect across said gauge resistances to form a bridge circuit in conjunction with said gauge resistances, an oxide film formed on the top of the diaphragm area, wherein additional patterns are formed on a portion of said diaphragm area other than said gauge resistances and said link resistances, the thickness of the oxide film on said additional pattern being smaller than the thickness of the oxide film formed on portions other than said gauge resistances, said link resistances, and said additional patterns.

Thus, the invention described herein makes possible the objective of providing a semiconductor pressure sensor in which the absolute value of the offset voltage is minimal and subject to less variation.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
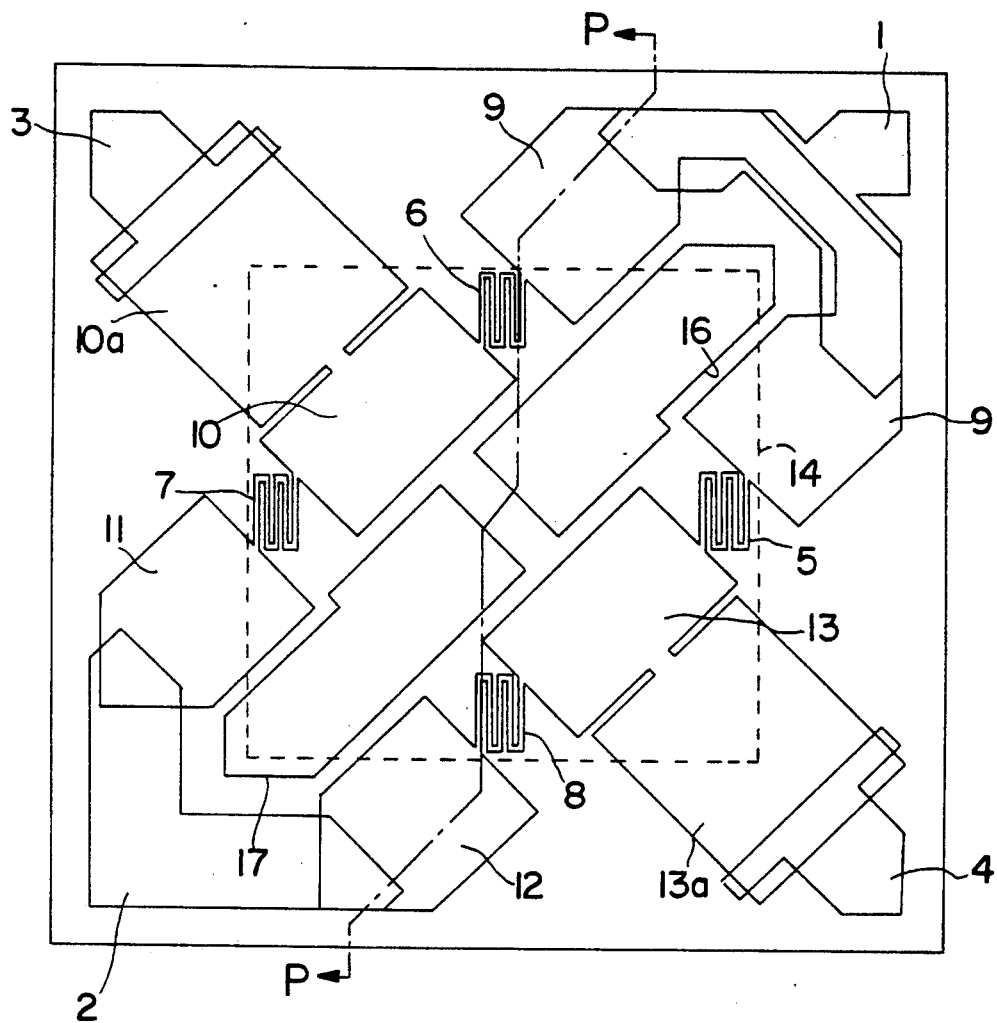
FIG. 1 is a plan view showing a semiconductor pressure sensor according to the invention.

A semiconductor pressure sensor according to the present invention is shown in plan view in FIG. 1. The semiconductor pressure sensor comprises a rectangular diaphragm area 14 formed centrally on the (100) face of an n-type silicon semiconductor chip, four gauge resistances 5, 6, 7 and 8 arranged on one surface within the diaphragm area 14 which are formed at respective median portions of individual sides of the diaphragm area 14, and low resistance link resistances 9, 10, 11, 12, and 13 which electrically interconnect the gauge resistances 5, 6, 7 and 8, the link resistances 9, 10, 11, 12 and 13 forming a bridge circuit in conjunction with the gauge resistances 5, 6, 7 and 8. The semiconductor chip has a size of 3.5 mm $\times$ 3.5 mm, and a thickness of 290 $\mu$m in its portion other than the diaphragm area 14, whereas the diaphragm area 14 has a thickness of 70 $\mu$m.

The link resistance 9 is electrically connected to the gauge resistances 5 and 6 and is partially formed with a bonding pad 1 for external biasing. A bonding pad 2 is connected to the link resistances 11 and 12 which are connected respectively to the gauge resistances 7 and 8. A lead-out resistance 10a is connected to the link resistance 10 which is electrically connected to the gauge resistances 6 and 7, and an output bonding pad 3 is connected to the lead-out resistance 10a. Similarly, a lead-out resistance 13a is connected to the link resistance 13 which is electrically connected to the gauge resistances 5 and 8, and an output bonding pad 4 is connected to the lead-out resistance 13a.

In the semiconductor pressure sensor of the present embodiment, there are formed additional patterns 16, 17 in portions of the diaphragm area 14 other than gauge resistances 5 to 8 and link resistances 9 to 13, and the silicon oxide film in the additional patterns 16, 17 is smaller in thickness than the silicon oxide film formed in regions other than gauge resistances 5 to 8, link resistances 9 to 13, and additional patterns 16, 17.

FIGS. 2(a) to 4(d) are sections taken along the line P—P in FIG. 1, which illustrate the process for producing the semiconductor pressure sensor of the present embodiment. The semiconductor pressure sensor of the embodiment is produced according to the following procedure. A silicon oxide film 21 is first formed by thermal oxidation on an n-type silicon base 20 to a thickness of 500 nm (FIG. 2(a)), and a resist (not shown) is coated over the silicon oxide film 21. Then, portions of the oxide film 21 and of the resist in which link resistances 9 to 13 are to be formed are removed by photolithoghography and etching. Next, boron ions of high concentration are implanted using the resist as a mask and then the resist is removed (FIG. 2(a)).

Figure 2A:
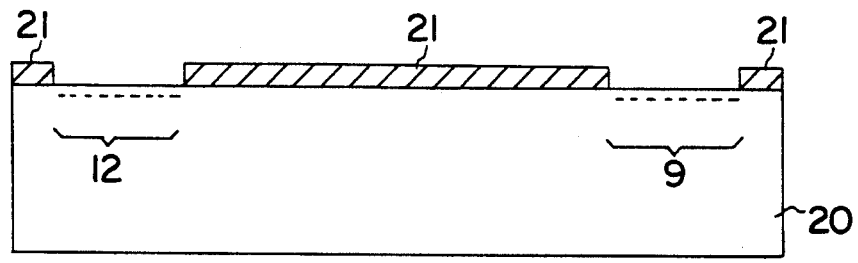
FIGS. 2(a), 2(b), 2(c), 2(d) are sections taken along the line P—P in FIG. 1.
Figure 2B:
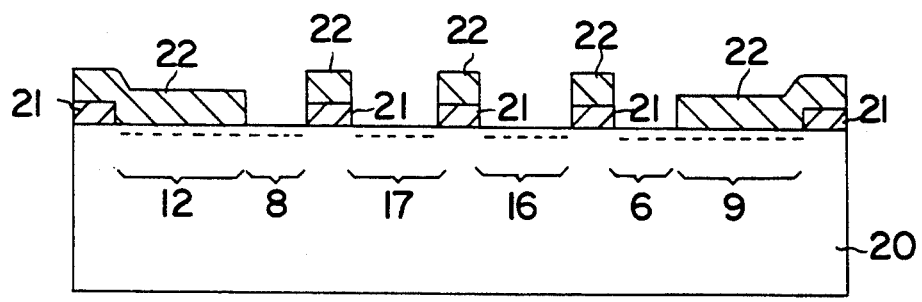

Again, a resist 22 (FIG. 2(b)) is formed all over the semiconductor base 20, and portions of the resist 22 and of the oxide film 21 in which gauge resistances 5 to 8 and additional patterns 16, 17 are to be formed are removed by photolithoghography and etching. Boron ions of low concentration are then implanted using the resist 22 as a mask (FIG. 2(b)). Subsequently, the semiconductor base is heated to thereby effect thermal diffusion of the boron ions in the additional patterns 16, 17, link resistances 9 to 13, and gauge resistances 5 to 8.

Figure 2C:
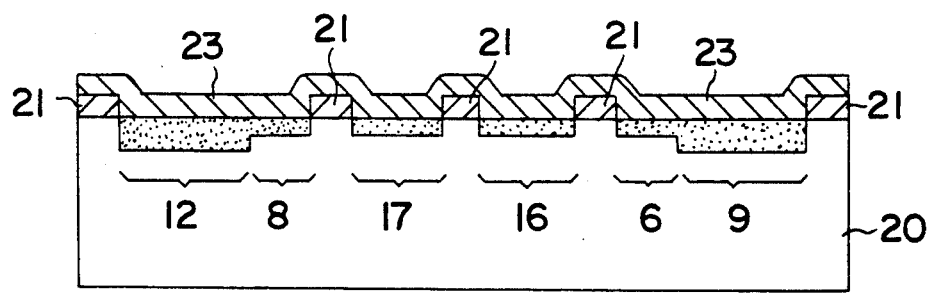
Figure 2D:
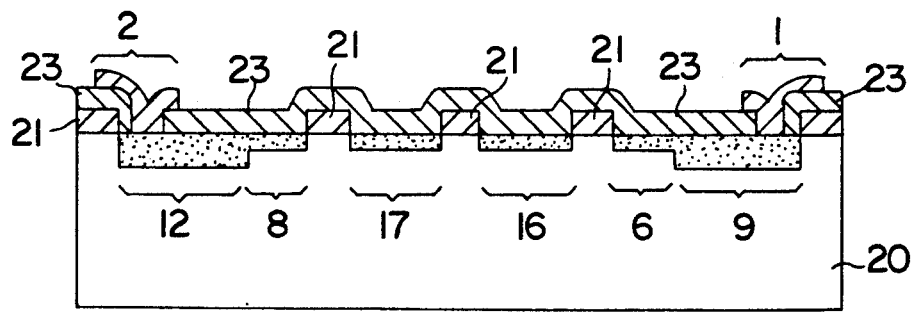

Next, a silicon oxide film 23 (FIG. 2(c)) is deposited to a thickness of 400 nm all over the semiconductor base 20 using the CVD (chemical vapor deposition) technique. Again, portions of the oxide film 23 in which bonding pads 1 and 2 are to be formed are removed by photolithoghography and etching. then, a film of aluminum metal is formed all over the semiconductor base 20, and bonding pads 1 and 2 are formed by photolithoghography and etching. The other side of the semiconductor base 20 is removed centrally, and the semiconductor base 20 is divided into chips, and the semiconductor pressure sensor shown in FIG. 1 is thus obtained.

Figure 3:
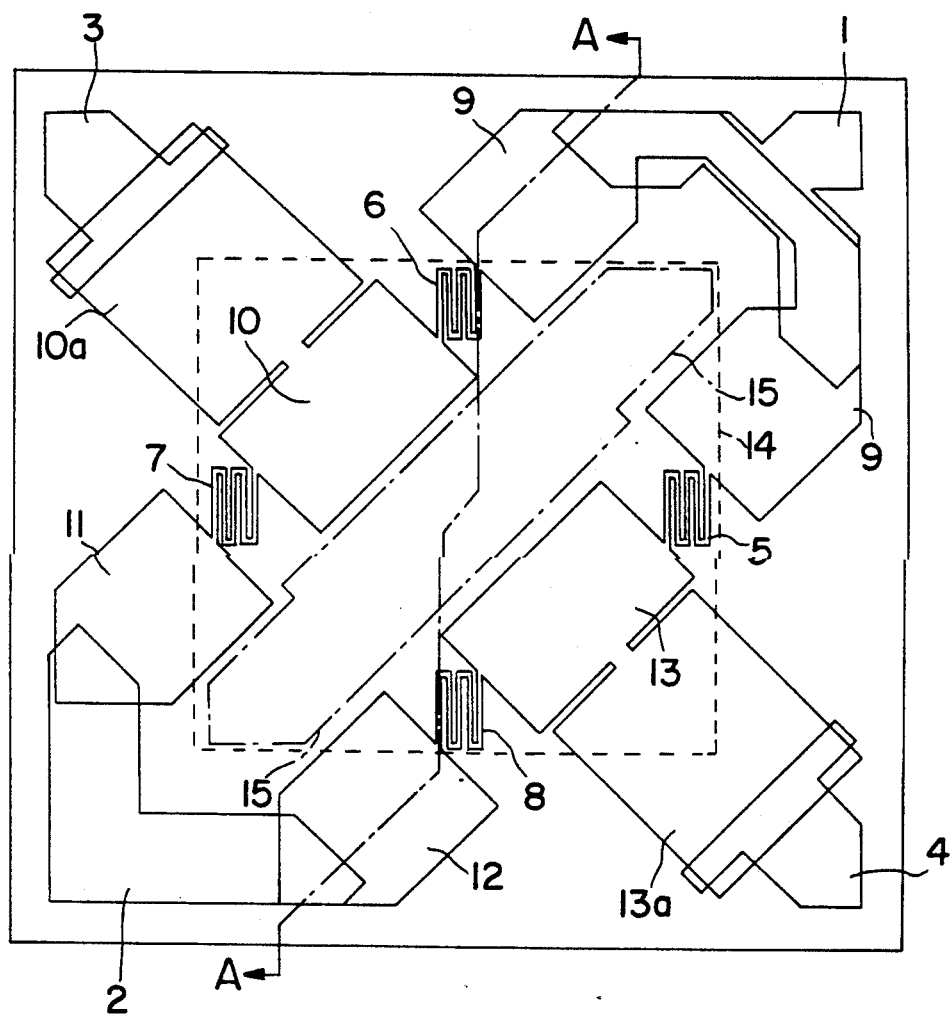
FIG. 3 is a plan view showing a conventional semiconductor pressure sensor.
Figure 4A:
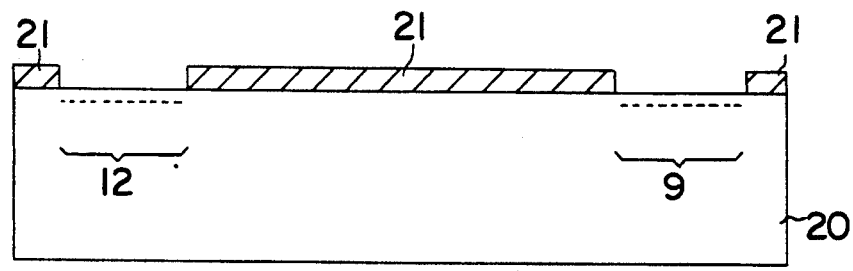
FIGS. 4(a), 4(b), 4(c), 4(d) are a sections taken along the line A—A in FIG. 3.
Figure 4B:
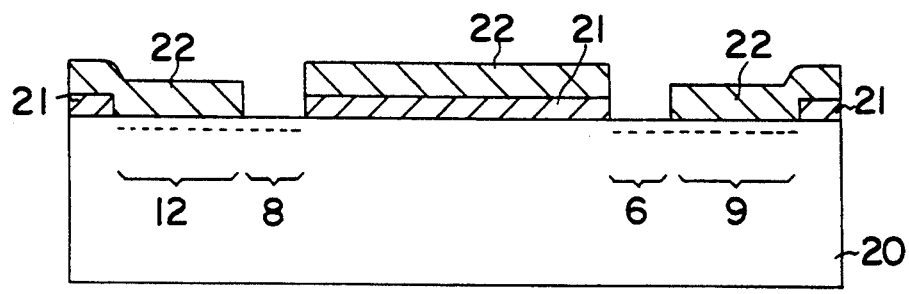
Figure 4C:
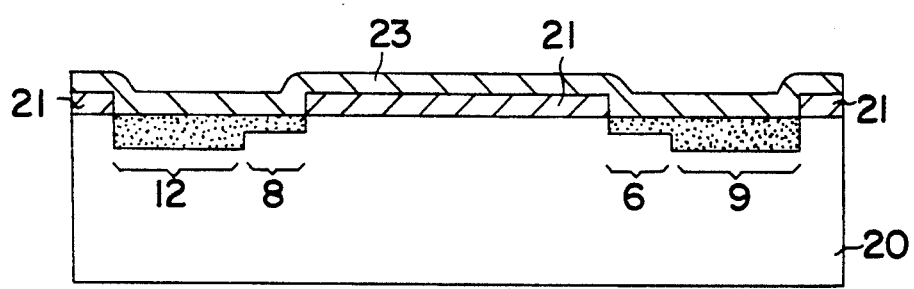
Figure 4D:
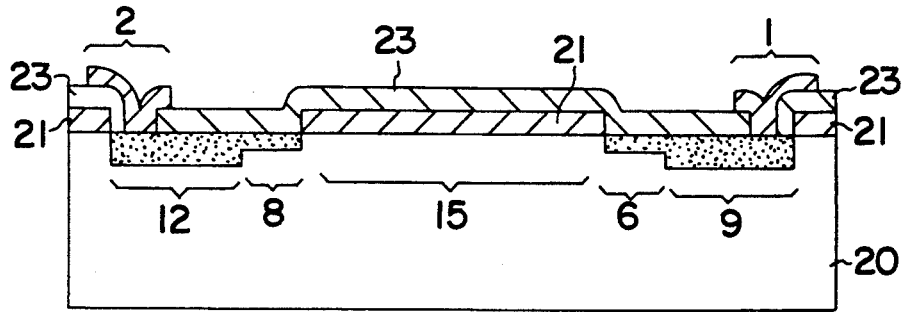

In the semiconductor sensor of this embodiment, additional patterns 16, 17 are formed in a portion corresponding to the residual area 15 in the conventional arrangement shown in FIG. 3. Only one silicon oxide film layer 23 is present on the additional patterns 16, 17, thus there being no possibility of internal stress development in the diaphragm area 14. This makes it possible to minimize the absolute value of the offset voltage in the case where no external pressure to be measured is present, and further to minimize possible variation thereof. As compared with the conventional semiconductor pressure sensor in which the mean value of the offset voltage was $\bar{x} = -5$ mV, with standard deviation $\sigma = 3$ mV, the semiconductor pressure sensor of the present embodiment exhibited $\bar{x} = -1$ mV, and $\sigma = 1$ mV.

In the present embodiment, the link resistances 9 to 13 are formed in the diaphragm area 14. Alternatively, they may be formed on a portion of the semiconductor chip outside the diaphragm area 14. In that case, additional patterns having larger areas than the additional patterns 16, 17 of FIG. 1 are formed in portions of the diaphragm area 14 other than the gauge resistances 5 to 8.

In the present example, the additional patterns 16, 17 were formed in the same manner as the gauge resistances 5 to 8. Alternatively, they may be formed by, for example, etching the silicon oxide films 21 and 23 on the residual area 15 in the conventional sensor shown in FIG. 4(d), thereby reducing the thickness thereof.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A semiconductor pressure sensor comprising a diaphragm area formed on one flat face of a semiconductor chip, a plurality of gauge resistances arranged in the semiconductor chip near said face of the diaphragm area to form a bridge circuit, and an oxide film formed on the semiconductor flat surface of the diaphragm area, wherein an additional pattern is formed in a portion of said oxide film in said diaphragm area other than said gauge resistances, the thickness of the oxide film which corresponds to said additional pattern being smaller than the thickness of the oxide film in portions other than said gauge resistances and said additional pattern.

2. A semiconductor pressure sensor comprising a diaphragm area formed on one flat face of a semiconductor chip, a plurality of gauge resistances arranged in the semiconductor chip near said face of the diaphragm area, wirings which electrically interconnect said gauge resistances to form a bridge circuit in conjunction with said gauge resistances, and an oxide film formed on the semiconductor flat surface of the diaphragm area, wherein an additional pattern is formed in a portion of said oxide film in said diaphragm area other than said gauge resistances and said wirings, the thickness of the oxide film which corresponds to said additional pattern being smaller than the thickness of the oxide film formed in portions other than said gauge resistances, and said wirings, and said additional pattern.

3. A semiconductor pressure sensor comprising a rectangular diaphragm area formed centrally on one flat surface of a semiconductor chip, four gauge resistances arranged on one face of the diaphragm area which are formed in respective median portions of individual sides in the semiconductor chip near said face of the diaphragm area, and wirings which electrically interconnect across said gauge resistances to form a bridge circuit in conjunction with said gauge resistances, an oxide film formed on the top of the diaphragm area, wherein additional patterns are formed in a portion of said oxide film in said diaphragm area other than said gauge resistances and said wirings, the thickness of the oxide film which corresponds to said additional pattern being smaller than the thickness of the oxide film formed in portions other than said gauge resistances, and said wirings and said additional patterns.

* * * * *